United States Patent
Yamaoka

(10) Patent No.: US 9,380,240 B2
(45) Date of Patent: Jun. 28, 2016

(54) SOLID-STATE IMAGING DEVICE WITH REDUNDANT COLUMN ADC CIRCUIT

(71) Applicant: Kabushiki Kaisha Toshiba, Minato-ku (JP)

(72) Inventor: Hiroaki Yamaoka, Setagaya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 8 days.

(21) Appl. No.: 14/454,906

(22) Filed: Aug. 8, 2014

(65) Prior Publication Data

US 2015/0271429 A1    Sep. 24, 2015

(30) Foreign Application Priority Data

Mar. 20, 2014  (JP) .................................. 2014-057708

(51) Int. Cl.
| | |
|---|---|
| H04N 5/335 | (2011.01) |
| H03M 1/00 | (2006.01) |
| H04N 5/3745 | (2011.01) |
| H04N 5/378 | (2011.01) |

(52) U.S. Cl.
CPC ........... *H04N 5/37455* (2013.01); *H04N 5/378* (2013.01)

(58) Field of Classification Search
CPC . H04N 5/3745; H04N 5/37455; H04N 5/357; H04N 5/378; H03M 1/12
See application file for complete search history.

(56) References Cited

U.S. PATENT DOCUMENTS

| | | | |
|---|---|---|---|
| 7,852,391 B2 | 12/2010 | Tinkler et al. | |
| 2002/0149683 A1* | 10/2002 | Post | H04N 5/2176 348/246 |
| 2006/0220939 A1* | 10/2006 | Kirsch | H04N 3/1575 341/155 |
| 2009/0273694 A1* | 11/2009 | Krymski | H04N 5/378 348/300 |
| 2010/0182473 A1 | 7/2010 | Nakamura | |
| 2010/0225796 A1* | 9/2010 | Lim | H03M 1/0607 348/308 |
| 2010/0283878 A1* | 11/2010 | Lin | H04N 5/35554 348/294 |
| 2011/0122274 A1* | 5/2011 | Itzhak | H04N 5/378 348/222.1 |

(Continued)

FOREIGN PATENT DOCUMENTS

| | | |
|---|---|---|
| JP | 2008-523772 | 7/2008 |
| JP | 2009-213012 | 9/2009 |

(Continued)

OTHER PUBLICATIONS

Office Action issued May 20, 2015 in Korean Patent Application No. 10-2014-107628 (with English translation).

(Continued)

*Primary Examiner* — Aung S Moe
*Assistant Examiner* — John H Morehead, III
(74) *Attorney, Agent, or Firm* — Oblon, McClelland, Maier & Neustadt, L.L.P.

(57) ABSTRACT

According to one embodiment, a solid-state imaging device is configured as follows. A pixel array portion is configured such that pixels storing photoelectrically converted charge are arranged in an m (m is a positive integer) by n (n is a positive integer) matrix. A column ADC circuit calculates, for each column, an AD-converted value of a pixel signal read from the pixel based on a comparison result between the pixel signal and a reference voltage. The redundant column ADC circuit can relieve each column of the column ADC circuit. The column selection circuit can make a selection for each column so that the pixel signal input to the column ADC circuit is also input to the redundant column ADC circuit.

17 Claims, 7 Drawing Sheets

(56) References Cited

U.S. PATENT DOCUMENTS

| | | | | |
|---|---|---|---|---|
| 2012/0138775 | A1* | 6/2012 | Cheon | H04N 5/361 |
| | | | | 250/208.1 |
| 2013/0113461 | A1* | 5/2013 | Mantri | H04N 5/359 |
| | | | | 324/103 R |
| 2013/0161488 | A1* | 6/2013 | Doi | H04N 5/378 |
| | | | | 250/208.1 |
| 2014/0368703 | A1* | 12/2014 | Yao | H04N 5/378 |
| | | | | 348/295 |

FOREIGN PATENT DOCUMENTS

| | | |
|---|---|---|
| JP | 2010-166528 | 7/2010 |
| JP | 2012-60334 | 3/2012 |
| WO | WO 2006/065922 A2 | 6/2006 |

OTHER PUBLICATIONS

Korean Office Action issued Nov. 23, 2015 in Patent Application No. 10-2014-0107628 (with English Translation).

* cited by examiner

SOLID-STATE IMAGING DEVICE WITH REDUNDANT COLUMN ADC CIRCUIT

CROSS-REFERENCE TO RELATED APPLICATIONS

This application is based upon and claims the benefit of priority from Japanese Patent Application No. 2014-057708, filed on Mar. 20, 2014; the entire contents of which are incorporated herein by reference.

FIELD

Embodiments described herein relate generally to a solid-state imaging device.

BACKGROUND

Some solid-state imaging devices are provided with a column ADC circuit for AD-converting a pixel signal for each column, in order to detect the pixel signal. When the column ADC circuit is broken, a defective column is generated, and the production yield is reduced.

DETAILED DESCRIPTION

According to one embodiment, a solid-state imaging device includes a pixel array portion, a column ADC circuit, redundant column ADC circuits, and a column selection circuit. The pixel array portion has a configuration in which pixels storing photoelectrically converted charge are arranged in an m (m is a positive integer) by n (n is a positive integer) matrix. The column ADC circuit calculates, for each column, an AD-converted value of a pixel signal read from the pixel based on a comparison result between the pixel signal and a reference voltage. The redundant column ADC circuit can relieve each column of the column ADC circuit. The column selection circuit can make a selection for each column so that the pixel signal input to the column ADC circuit is also input to the redundant column ADC circuit.

Exemplary embodiments of the solid-state imaging device will be explained below in detail with reference to the accompanying drawings. The present invention is not limited to the following embodiments.

(First Embodiment)

Figure 1:
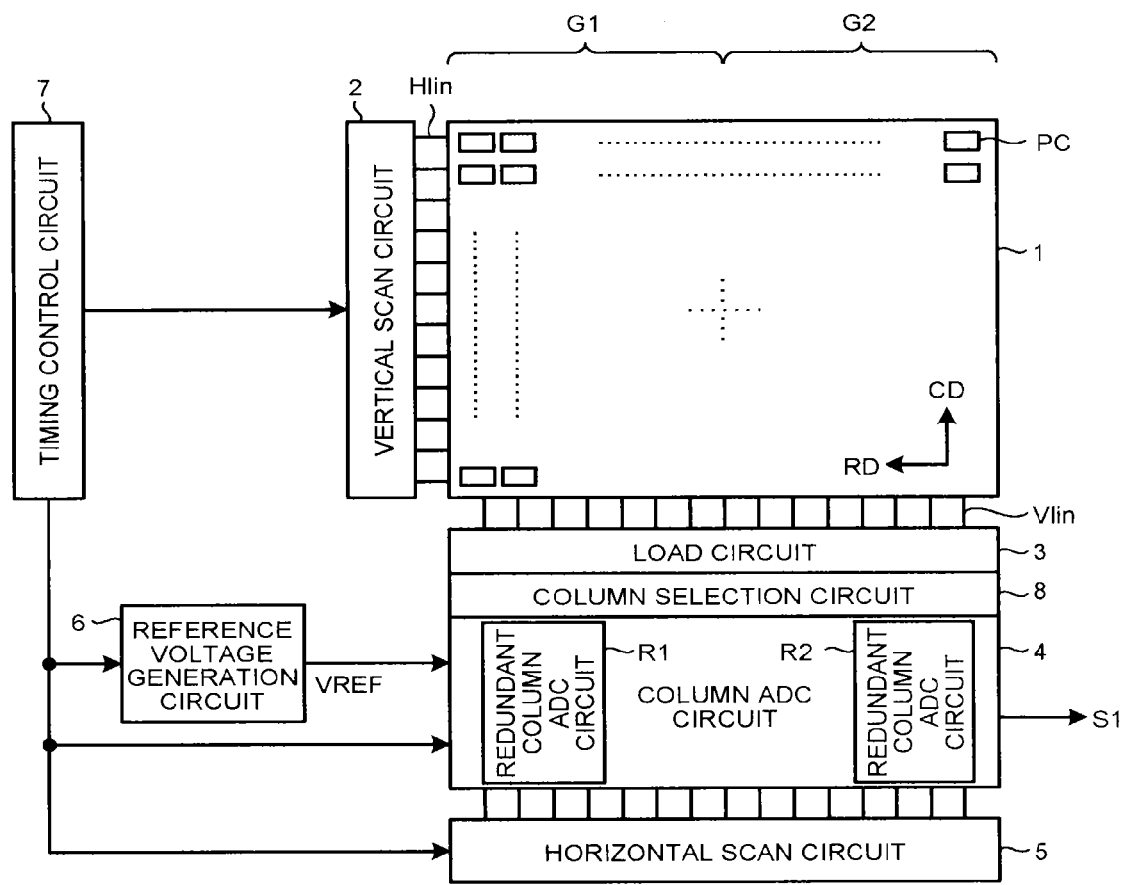
FIG. 1 is a schematic block diagram of a configuration of a solid-state imaging device according to a first embodiment.

FIG. 1 is a schematic block diagram of a configuration of a solid-state imaging device according to a first embodiment.

In FIG. 1, the solid-state imaging device is provided with a pixel array portion 1. The pixel array portion 1 has a configuration in which pixels PC storing photoelectrically converted charge are arranged in an m (m is a positive integer) by n (n is a positive integer) matrix, in a row direction RD and a column direction CD. In the pixel array portion 1, a horizontal control line Hlin for controlling the read of the pixel PC is provided in the row direction RD, and a vertical signal line Vlin for transmitting a signal read from the pixel PC is provided in the column direction CD.

The solid-state imaging device includes a vertical scan circuit 2, a load circuit 3, a column ADC circuit 4, a horizontal scan circuit 5, a reference voltage generation circuit 6, and a timing control circuit 7. The vertical scan circuit 2 scans the pixel PC to be read in a vertical direction. The load circuit 3 performs a source follower operation with the pixel PC to read a pixel signal from the pixel PC to the vertical signal line Vlin for each column. The column ADC circuit 4 detects a signal component of each pixel PC in correlated double sampling (CDS) for each column. The horizontal scan circuit 5 horizontally scans the pixel PC to be read. The reference voltage generation circuit 6 outputs a reference voltage VREF to the column ADC circuit 4. The timing control circuit 7 controls the timing of read or storage of each pixel PC.

The solid-state imaging device is provided with redundant column ADC circuits R1 and R2 capable of relieving the column ADC circuit 4 for each column, and a column selection circuit 8 capable of making a selection for each column so that a pixel signal input to the column ADC circuit 4 is also input to the redundant column ADC circuits R1 and R2. In such a configuration, for example, n columns are grouped, and two groups G1 and G2 are generated. The column selection circuit 8 can select the redundant column ADC circuit R1 for a column of the group G1, and select the redundant column ADC circuit R2 for a column of the group G2. The horizontal scan circuit 5 can be constituted by a horizontal register for horizontally transferring (n+p) output signals, wherein the number of column ADC circuits 4 is denoted as n, and the number of redundant column ADC circuits R1 and R2 is denoted as p.

In the vertical scan circuit 2, the pixels PC are scanned vertically to select the pixel PC in the row direction RD. Between the load circuit 3 and the pixels PC, the source follower operation is performed to transfer a pixel signal read from the pixel PC through the vertical signal line Vlin, and the pixel signal is transmitted to the column ADC circuit 4. In the reference voltage generation circuit 6, a ramp wave is set as a reference voltage VREF and transmitted to the column ADC circuit 4. In the column ADC circuit 4, counting operation of a clock is performed until a signal level and a reset level, which have been read from the pixel PC, coincide with a level of the ramp wave, a difference is made between the signal level and the reset level at that time, and the signal components of the pixels PC are detected in the CDS and output as an output signal S1.

When the columns of the group G1 have a defective column in the column ADC circuit 4, the pixel signal input to the defective column of the column ADC circuit 4 is also input to the redundant column ADC circuit R1. In the redundant column ADC circuit R1, the counting operation of the clock is performed until a signal level and a reset level, which have been read from the pixel PC of the defective column, coincide with a level of the ramp wave, a difference is made between the signal level and the reset level at that time, and the signal components of the pixels PC of the defective column are detected in the CDS and output as the output signal S1. Accordingly, even if the defective column is generated in the column ADC circuit 4, the defective column can be relieved, and the production yield can be increased.

Figure 2:
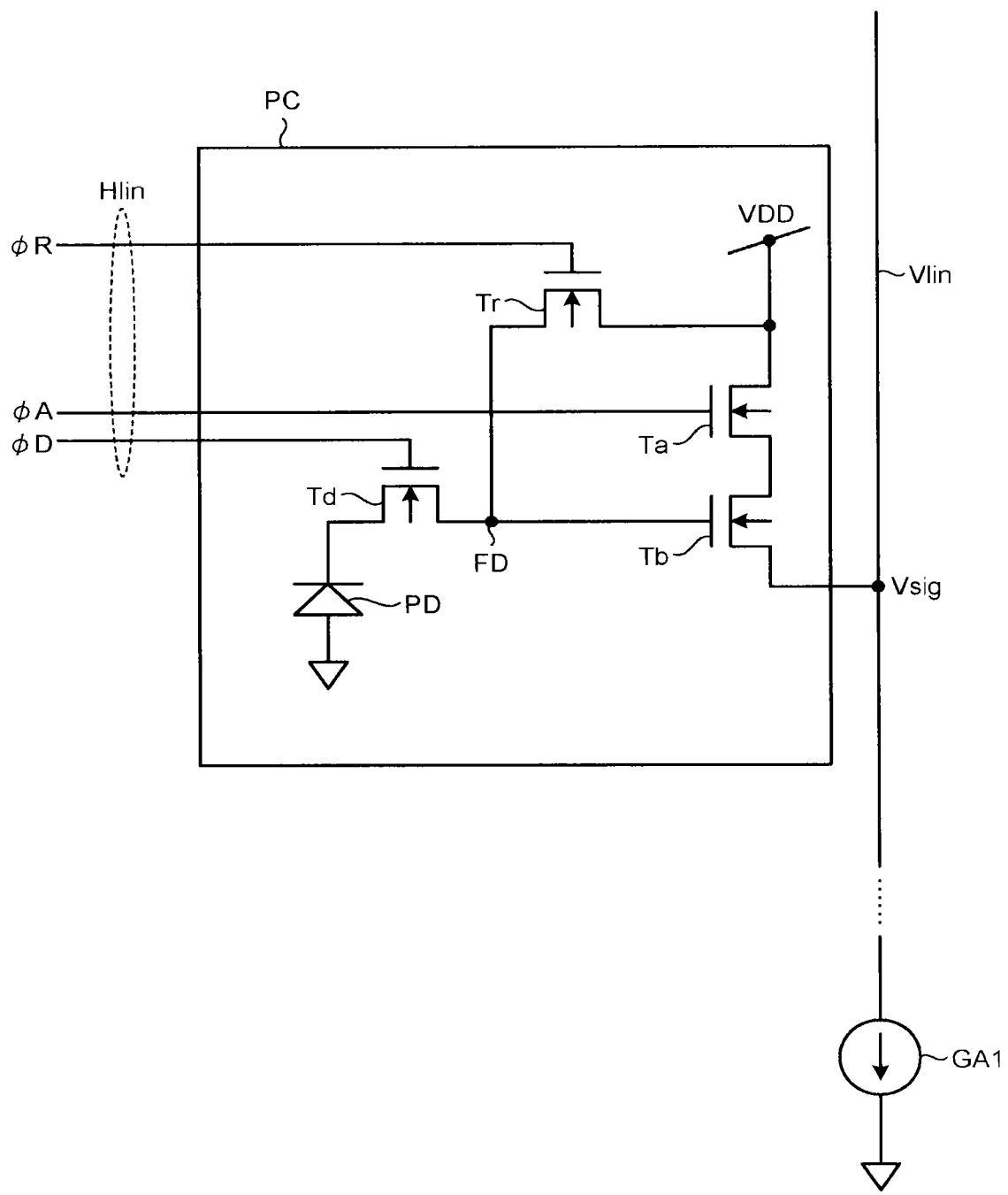
FIG. 2 is a circuit diagram of an exemplary configuration of pixels of the solid-state imaging device of FIG. 1.

FIG. 2 is a circuit diagram of an exemplary configuration of pixels of the solid-state imaging device of FIG. 1.

In FIG. 2, each of the pixels PC is provided with a photodiode PD, a row selection transistor Ta, an amplifier transistor Tb, a reset transistor Tr, and a read transistor Td. At a connection point among the amplifier transistor Tb, the reset transistor Tr, and the read transistor Td, a floating diffusion FD is formed as a detection node.

In the pixel PC, the read transistor Td has a source connected to the photodiode PD, and a read signal ΦD is input to a gate of the read transistor Td. The reset transistor Tr has a source connected to a drain of the read transistor Td. The reset transistor Tr has a gate to which a reset signal ΦR is input. The reset transistor Tr has a drain connected to a power supply potential VDD. The row selection transistor Ta has a gate to which a row selection signal ΦA is input. The row selection transistor Ta has a drain connected to the power supply potential VDD. The amplifier transistor Tb has a source connected to the vertical signal line Vlin. The amplifier transistor Tb has a gate connected to the drain of the read transistor Td. The amplifier transistor Tb has a drain connected to a source of the row selection transistor Ta. The horizontal control lines Hlin of FIG. 1 can transmit, to the pixel PC, the read signal ΦD, the reset signal ΦR, and the row selection signal ΦA, for each row. The load circuit 3 of FIG. 1 is provided with a constant-current source GA1, for each column, and the constant-current source GA1 is connected to the vertical signal line Vlin.

Figure 3:
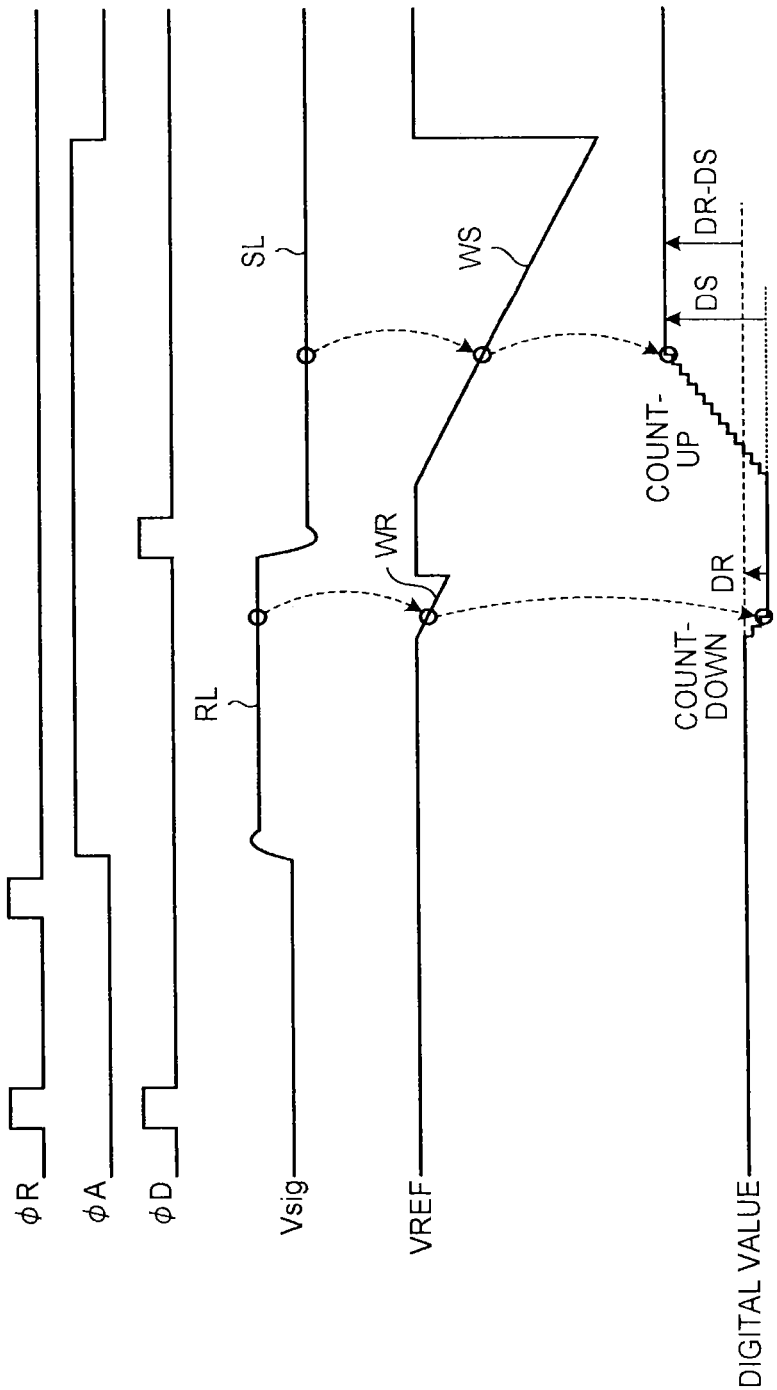
FIG. 3 is a timing chart of voltage waveforms of component units while reading the pixels of FIG. 1.

FIG. 3 is a timing chart of voltage waveforms of component units while reading the pixels of FIG. 1.

In FIG. 3, when the row selection signal ΦA is at a low level, the row selection transistor Ta is turned off, and the source follower operation is not performed. Therefore, the signal is not output to the vertical signal line Vlin. At that time, when the read signal ΦD and the reset signal ΦR are at a high level, the read transistor Td is turned on, and electrical charge stored in the photodiode PD is discharged to the floating diffusion FD. The electrical charge is discharged to the power supply potential VDD through the reset transistor Tr.

When the read signal ΦD is at a low level after the electrical charge having been stored in the photodiode PD is discharged to the power supply potential VDD, effective storage of signal charge is started in the photodiode PD.

Then, when the reset signal ΦR rises, the reset transistor Tr is turned on, and excessive electrical charge generated due to a leak current or the like in the floating diffusion FD is reset.

When the row selection signal ΦA is at a high level, the row selection transistor Ta of the pixel PC is turned on, and the power supply potential VDD is applied to the drain of the amplifier transistor Tb. As a result, the amplifier transistor Tb and the constant-current source GA1 constitute the source follower. Accordingly, a voltage according to a reset level RL of the floating diffusion FD is applied to the gate of the amplifier transistor Tb. Since the source follower is constituted by the amplifier transistor Tb and the constant-current source GA1, the voltage of the vertical signal line Vlin follows the voltage applied to the gate of the amplifier transistor Tb, and a pixel signal Vsig of the reset level RL is output to the column ADC circuit 4 through the vertical signal line Vlin.

At that time, a ramp wave WR is given as the reference voltage VREF, and the pixel signal Vsig at the reset level RL and the reference voltage VREF are compared to each other. Down-counting is performed until the pixel signal Vsig of the reset level RL coincides with the level of the reference voltage VREF, so that the pixel signal Vsig at the reset level RL is held by being converted to a digital value DR.

Next, when the read signal ΦD rises, the read transistor Td is turned on, the electrical charge stored in the photodiode PD is transferred to the floating diffusion FD, and a voltage according to a signal level SL of the floating diffusion FD is applied to the gate of the amplifier transistor Tb. Since the source follower is constituted by the amplifier transistor Tb and the constant-current source GA1, the voltage of the vertical signal line Vlin follows the voltage applied to the gate of the amplifier transistor Tb, and the pixel signal Vsig at the signal level SL is output to the column ADC circuit 4 through the vertical signal line Vlin.

At that time, the ramp wave WS is given as the reference voltage VREF, and the pixel signal Vsig at the signal level SL and the reference voltage VREF are compared to each other. Up-counting is performed until the pixel signal Vsig at the signal level SL coincides with the level of the reference voltage VREF, and the pixel signal Vsig at the signal level SL is converted to a digital value DS. A difference DR−DS between the pixel signal Vsig at the reset level RL and the pixel signal Vsig at the signal level SL is held, and the AD-converted value of the difference is output as the output signal S1.

Figure 4:
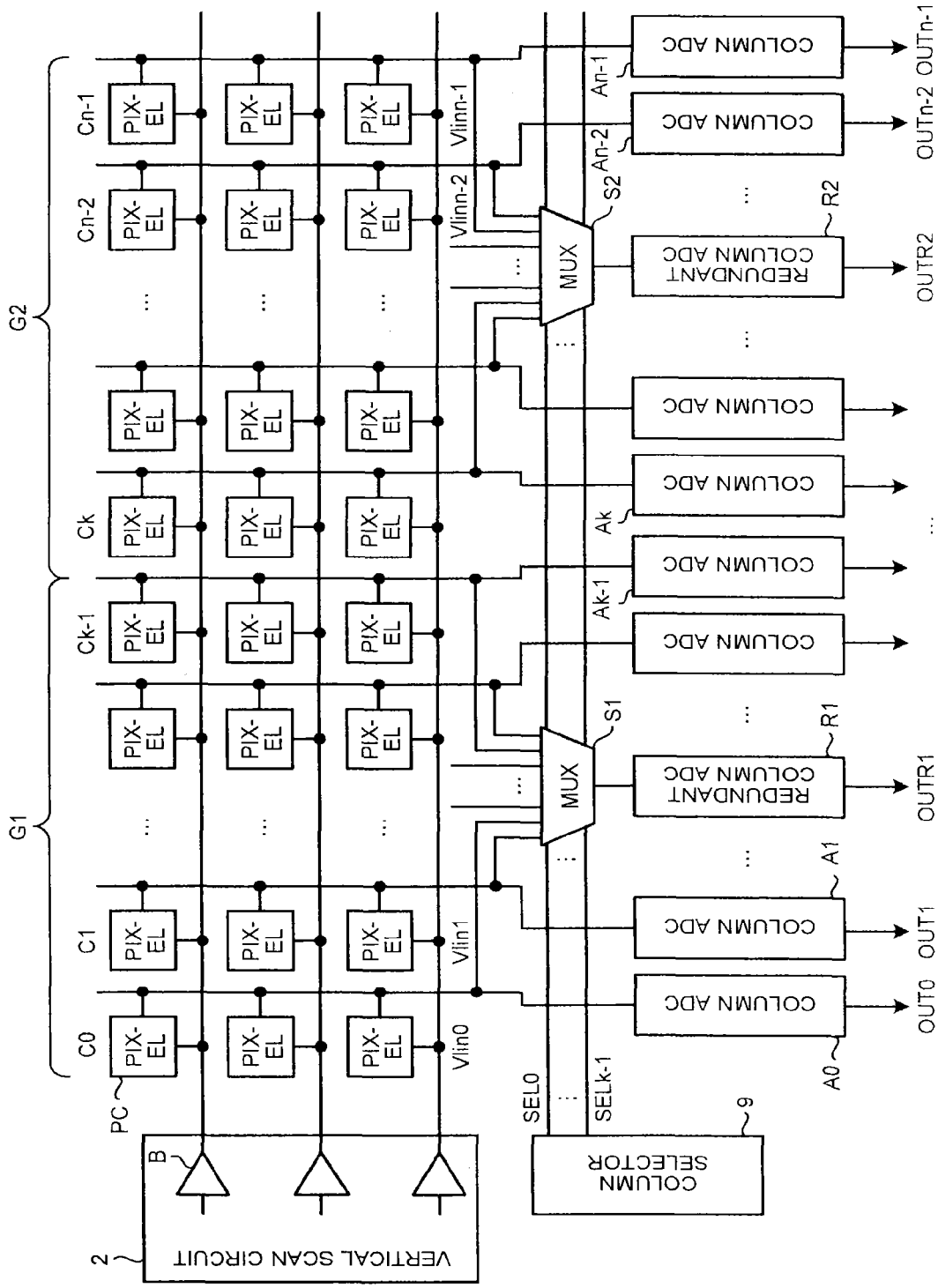
FIG. 4 is a block diagram of an exemplary configuration of a column switch circuit of FIG. 1.

FIG. 4 is a block diagram of an exemplary configuration of a column switch circuit of FIG. 1. FIG. 4 illustrates an example of grouping n columns C0 to Cn−1 into a group G1 of columns C0 to Ck−1 (k is an integer of 2 or more and n or less) and a group G2 of columns Ck to Cn−1. The groups G1 and G2 may each include, for example, k columns. The numbers of columns of the groups G1 and G2 may be different from each other.

In FIG. 4, the pixel array portion 1 is provided with vertical signal lines Vlin0 to Vlinn−1 for transmission of a signal having been read from the pixel PC for columns C0 to Cn−1. The vertical scan circuit 2 is provided with a driver B for driving the pixel PC for each row. The column ADC circuit 4 is provided with column ADC units A0 to An−1 for respective columns, and the redundant column ADC circuits R1 and R2 for the respective groups G1 and G2. The column ADC units A0 to An−1 output output signals OUT0 to OUTn−1 obtained by AD-converting the pixel signals of the columns C0 to Cn−1. The column selection circuit 8 is provided with a column selector 9, and multiplexers S1 and S2 for the respective groups G1 and G2. The multiplexer S1 can select one from the pixel signals of the columns C0 to Ck−1, and input the selected pixel signal to the redundant column ADC circuit R1. The multiplexer S2 can select one from the pixel signals of the columns Ck to Cn−1 and input the selected pixel signal to the redundant column ADC circuit R2. The divided vertical signal lines Vlin0 to Vlinn−1 allow k inputs to the multiplexers S1 and S2. The column selector 9 outputs selection signals SEL0 to SELk−1 to the multiplexers S1 and S2 to designate columns to be selected for the multiplexers S1 and S2.

For example, when defect of the column ADC unit A1 is detected, a selection signal SEL1 is activated, and the vertical signal line Vlin1 is connected to the redundant column ADC circuit R1 at the multiplexer S1. At this time, selection signals SEL0 to SELk−1 common with those of the multiplexer S1 are given to the multiplexer S2. Therefore, even if a column ADC unit Ak+1 has no defect, a vertical signal line Vlink+1 is connected to the redundant column ADC circuit R2.

By giving the common selection signals SEL0 to SELk−1 to the multiplexers S1 and S2, the defective column can be relieved while the increase in the number of wires for the selection signals SEL0 to SELk−1 is restricted.

It is noted that the output signals OUT0 to OUTn−1 are output from the column ADC units A0 to An−1, respectively, and the output signals OUTR1 and OUTR2 are output from the redundant column ADC circuits R1 and R2, respectively.

The output signals OUT0 to OUTn−1, OUTR1, and OUTR2 are output sequentially as an output signal S1 through the horizontal scan circuit 5 in the order of the column ADC unit A0 to the column ADC unit An−1 and the redundant column ADC circuit R1 and the redundant column ADC circuit R2.

(Second Embodiment)

Figure 5:
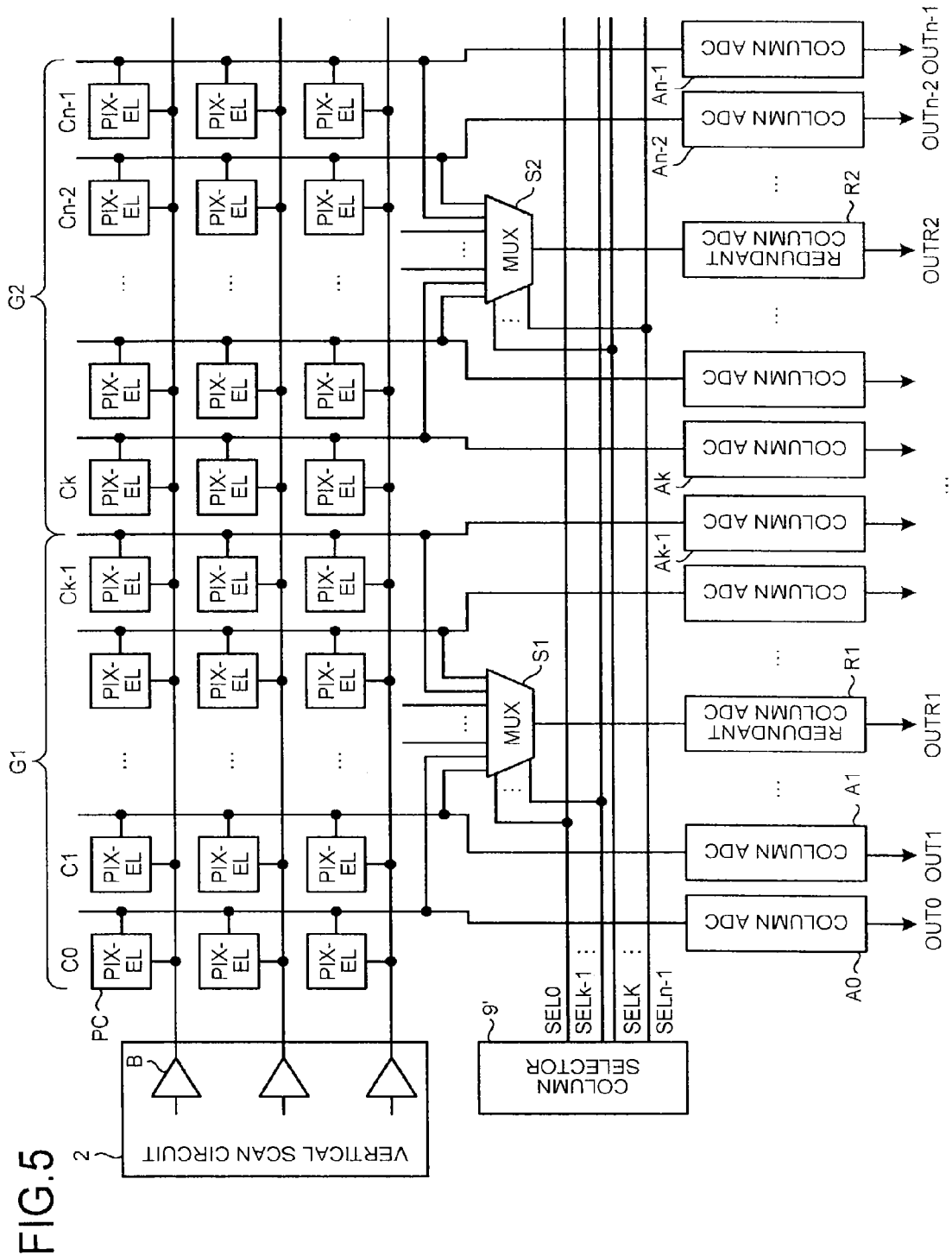
FIG. 5 is a block diagram of an exemplary configuration of a column switch circuit applied to a solid-state imaging device according to a second embodiment.

FIG. 5 is a block diagram of an exemplary configuration of a column switch circuit applied to a solid-state imaging device according to a second embodiment.

In FIG. 5, the solid-state imaging device includes a column selector 9' in place of the column selector 9 of FIG. 4. The column selector 9' designates columns to be selected for the multiplexers S1 and S2, respectively. In other words, the column selector 9 can output selection signals SEL0 to SELk−1 to the multiplexer S1, and output the selection signals SELk to SELn−1 to the multiplexer S2.

For example, when defect of the column ADC unit A1 is detected, a selection signal SEL1 is activated, and the vertical signal line Vlin1 is connected to the redundant column ADC circuit R1 at the multiplexer S1. At this time, the selection signals SELk to SELn−1 different from those of the multiplexer S1 are given to the multiplexer S2. Therefore, when the column ADC unit Ak+1 has no defect, the vertical signal line Vlink+1 is not connected to the redundant column ADC circuit R2. When the defect is also detected in the column ADC unit Ak+1, the selection signal SELk+1 is also activated, and the vertical signal line Vlink+1 is connected to the redundant column ADC circuit R2 at the multiplexer S2.

The different selection signals SEL0 to SELn−1 are given to the multiplexers S1 and S2, so that any of the vertical signal lines Vlin0 to Vlinn−1 can be selected for each of the groups G1 and G2, and a plurality of defective columns can be relieved.

(Third Embodiment)

Figure 6:
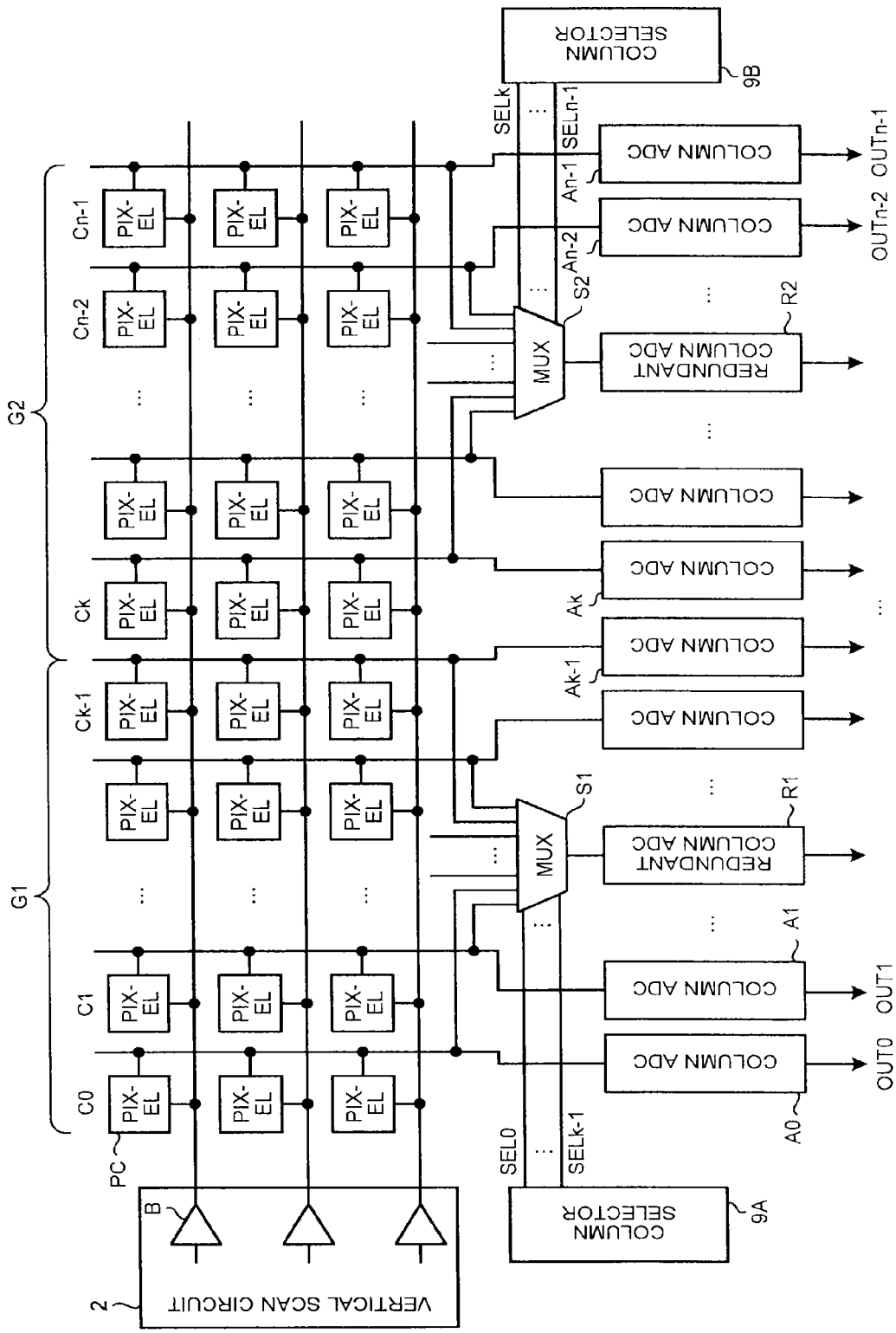
FIG. 6 is a block diagram of an exemplary configuration of a column switch circuit applied to a solid-state imaging device according to a third embodiment.

FIG. 6 is a block diagram of an exemplary configuration of a column switch circuit applied to a solid-state imaging device according to a third embodiment.

In FIG. 6, in the solid-state imaging device, column selectors 9A and 9B are provided in place of the column selector 9 of FIG. 4. The column selectors 9A and 9B are disposed on both sides of the column ADC circuit 4. The column selector 9A can designate a column to be selected from a group G1 for a multiplexer S1. The column selector 9B can designate a column to be selected from a group G2 for a multiplexer S2. In other words, the column selector 9A can output the selection signals SEL0 to SELk−1 to the multiplexer S1, and the column selector 9B can output selection signals SELk to SELn−1 to the multiplexer 52.

For example, when the defect of the column ADC unit A1 is detected, the selection signal SEL1 is activated at the column selector 9A, and the vertical signal line Vlin1 is connected to the redundant column ADC circuit R1 at the multiplexer S1. When the defect of the column ADC unit Ak+1 is detected, the selection signal SELk+1 is activated at the column selector 9B, and the vertical signal line Vlink+1 is connected to the redundant column ADC circuit R2 at the multiplexer S2.

The column selectors 9A and 9B are disposed on both sides of the column ADC circuit 4 so that any of the vertical signal lines Vlin0 to Vlinn−1 can be selected for each of the groups G1 and G2, while the increase in the wiring regions of the selection signals SEL0 to SELn−1 is restricted, and a plurality of defective columns can be relieved.

It is noted that exemplary configurations for grouping n columns C0 to Cn−1 into the groups G1 and G2 have been described according to FIGS. 4 to 6, but a configuration for grouping the n columns C0 to Cn−1 into three or more groups may be employed.

(Fourth Embodiment)

Figure 7:
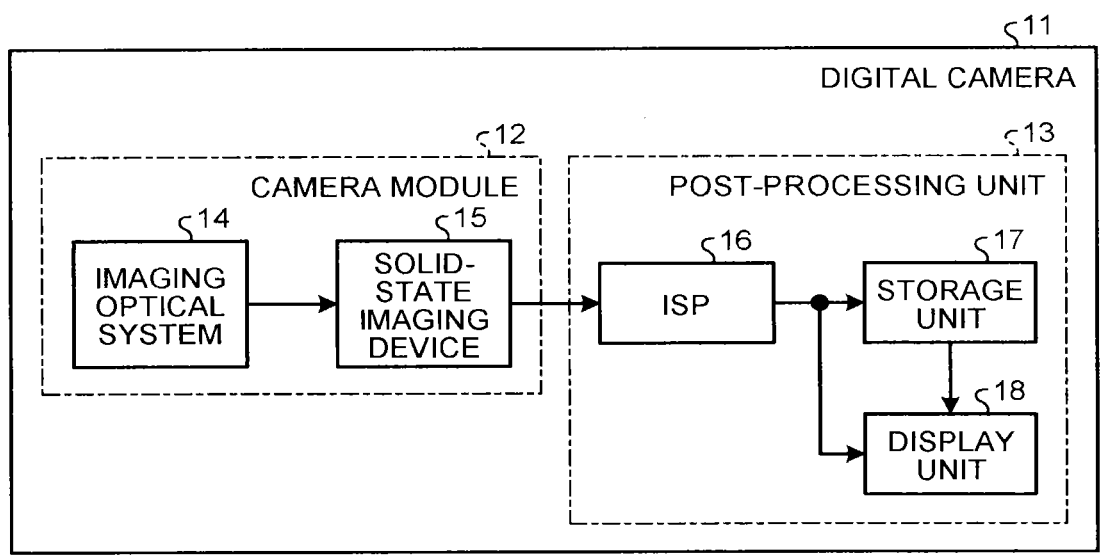
FIG. 7 is a schematic block diagram of a configuration of a digital camera to which a solid-state imaging device according to a fourth embodiment is applied.

FIG. 7 is a schematic block diagram of a configuration of a digital camera to which a solid-state imaging device according to a fourth embodiment is applied.

In FIG. 7, the digital camera 11 has a camera module 12 and a post-processing unit 13. The camera module 12 has an imaging optical system 14 and a solid-state imaging device 15. The post-processing unit 13 has an image signal processor (ISP) 16, a storage unit 17, and a display unit 18. At least part of the configuration of the ISP 16 may be formed into one chip with the solid-state imaging device 15. The solid-state imaging device 15 may use any of the configurations of FIG. 1, and FIGS. 4 to 6.

Light from a subject is reflected into the imaging optical system 14 to form a subject image. The solid-state imaging device 15 images the subject image. The ISP 16 processes an image signal obtained by imaging at the solid-state imaging device 15. At this time, for example, when defective columns are replaced in the redundant column ADC circuits R1 and R2 of FIG. 4, the ISP 16 may eliminate output signals of the defective columns, and may sort the output signals OUT0 to OUTn−1, OUTR1, and OUTR2 in order so that the output signals OUTR1 and OUTR2 of the redundant column ADC circuits R1 and R2 are at the positions of the defective columns. The storage unit 17 stores an image having been subjected to signal processing in the ISP 16. The storage unit 17 outputs the image signal to the display unit 18 according to the operation of the user or the like. The display unit 18 displays an image according to the image signal having been input from the ISP 16 or the storage unit 17. The display unit 18 includes, for example, a liquid crystal display. The camera module 12 may be applied to, for example, an electronic device such as a mobile phone with a camera, in addition to the digital camera 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
a pixel array portion having pixels arranged in an m (m is a positive integer) by n (n is a positive integer) matrix, the pixel storing photoelectrically converted charge;
a column ADC circuit configured to calculate, for each column, an AD-converted value of a pixel signal read from the pixel based on a comparison result between the pixel signal and a reference voltage;
a redundant column ADC circuit configured to replace each column of the column ADC circuit; and
a column selection circuit configured to make a selection for each column such that the pixel signal input to the column ADC circuit is also input to the redundant column ADC circuit, wherein the column selection circuit comprises:
a multiplexer configured to select one from pixel signals of k (k is an integer of 2 or more and n or less) columns and input the selected pixel signal to the redundant column ADC circuit for one column; and a column selector configured to designate a column to be selected for the multiplexer, wherein the multiplexer is provided for each of groups obtained by grouping the n columns, and wherein the multiplexer is disposed between the pixel array portion and the redundant column ADC circuit.

2. The solid-state imaging device according to claim 1, wherein the redundant column ADC circuit for one column is provided for each of the groups.

3. The solid-state imaging device according to claim 1, wherein the column selector is provided on each side of the column ADC circuit.

4. The solid-state imaging device according to claim 2, wherein the column selector is provided for each of the groups.

5. The solid-state imaging device according to claim 4, wherein a first column selector inputs a first selection signal to a first multiplexer, and a second column selector inputs a second selection signal to a second multiplexer.

6. The solid-state imaging device according to claim 2, wherein the column selector is commonly provided between the groups.

7. The solid-state imaging device according to claim 6, wherein the column selector inputs a common selection signal to a first multiplexer and a second multiplexer.

8. The solid-state imaging device according to claim 4, wherein the column selector inputs a separate selection signal to each of a first multiplexer and a second multiplexer.

9. The solid-state imaging device according to claim 1, wherein the redundant column ADC circuits are aligned alongside the column ADC circuits in a row direction.

10. The solid-state imaging device according to claim 9, wherein the redundant column ADC circuit is disposed at the center of the columns of the group.

11. The solid-state imaging device according to claim 10, the column selector is disposed on a lateral side of the multiplexer.

12. The solid-state imaging device according to claim 1, further comprising a horizontal scan circuit having a horizontal register configured to horizontally transfer (n+p) output signals, wherein the number of the column ADC circuits is denoted by n, and the number of the redundant column ADC circuits is denoted by p.

13. The solid-state imaging device according to claim 1, further comprising a vertical signal line configured to transmit a pixel signal read from the pixel to the column ADC circuit for each column, wherein k inputs for the column selection circuit are provided by branching the vertical signal lines of k (k is an integer of 2 or more and n or less) columns, and one output from the column selection circuit is input to the redundant column ADC circuit for one column.

14. The solid-state imaging device according to claim 13, wherein the vertical signal line is branched between the pixel array portion and the column ADC circuit.

15. The solid-state imaging device according to claim 1, wherein the column ADC circuit is configured to perform counting operation of a clock until a signal level and a reset level read from the pixel coincide with a level of a ramp wave, and to detect a signal component of each pixel in CDS by taking a difference between the signal level and the reset level at that time.

16. The solid-state imaging device according to claim 1, wherein the redundant column ADC circuit is configured to perform counting operation of a clock until a signal level and a reset level read from a pixel of a defective column coincide with a level of a ramp wave, and to detect a signal component of each pixel in CDS by taking a difference between the signal level and the reset level at that time.

17. The solid-state imaging device according to claim 1, wherein the column ADC circuit replaced with the redundant column ADC circuit is a defective column.

* * * * *